April 20, 1948.   W. A. SISSON   2,439,815
COMPOSITE THERMOPLASTIC FIBERS
Filed April 3, 1945
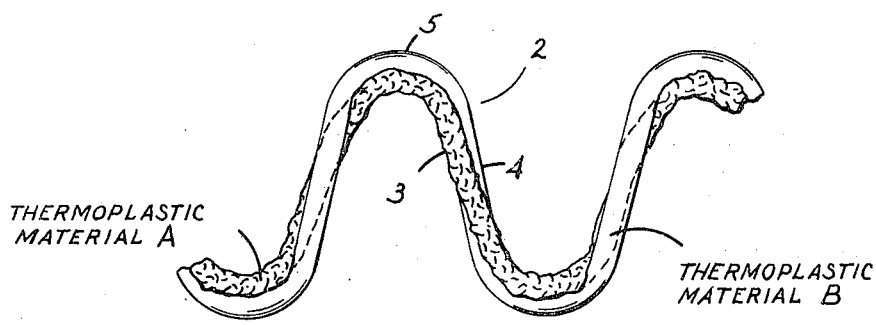
INVENTOR.
WAYNE A. SISSON
BY Patented Apr. 20, 1948

2,439,815

UNITED STATES PATENT OFFICE 2,439,815

COMPOSITE THERMOPLASTIC FIBERS

Wayne A. Sisson, Silverside, Del., assignor to American Viscose Corporation, Wilmington, Del., a corporation of Delaware Application April 3, 1945, Serial No. 586,451

11 Claims. (Cl. 28—82)

This invention relates to composite thermoplastic fibers.

This application is a continuation-in-part of my prior application Serial No. 486,773, which filed May 13, 1943, discloses composite fibers formed from two or more fiber-forming materials of different properties joined by intermingled portions of the materials making up the components, which fibers are reversibly convertible from a straight smooth condition to a crimpy condition, and of my application Serial No. 554,549 filed September 16, 1944, which discloses fabricated structures formed from composite fibers comprising two or more fiber-forming materials of different properties joined by intermingled portions of the materials making up the components, which fibers are reversibly convertible from a straight smooth condition to a crimpy condition in situ in the fabricated structure, the fibers being in the straight condition at the time of fabrication.

The present application is more particularly concerned with composite fibers comprising at least two eccentrically arranged thermoplastic components extending side by side the entire length of the fiber, joined by intermingled portions of the materials making up the components, and having different characteristics rendering the fibers reversibly convertible between an inherent substantially relaxed crimped condition and an internally stressed straight condition. The fibers may be in a set stretched condition in which the components are differentially strained internally, so that they are potentially self-crimpable in response to shrinkage of at least one of the components upon application of a predetermined degree of heat to the fiber, or the fibers may be in the crimped condition in which they are set, after activation of at least one of the components to the heat shrunk, crimped state.

The single figure of the drawing is illustrative of the invention.

Generally stated, the invention comprises forming at least two different fiber-forming thermoplastic materials, or materials which may be rendered thermoplastic, into a unitary fiber in which the different components are eccentrically arranged in side by side relation along the entire length of the fiber, rendering the fibers potentially self-crimpable by stretching them, while in at least partially plastic condition, so that the amount of stretch is beyond the elastic limit of at least one of the components and below the ultimate elongation of the least extensible component, bringing at least one of the components into the unplasticized condition while maintaining the fibers under tension, and subsequently crimping the fibers by heating them to a temperature within the range between the shrinkage temperatures of the components.

The composite fibers of the invention may be produced, for example, by extruding two or more fiber-forming materials which are thermoplastic or which may be rendered thermoplastic, or solutions of such materials, in separate or only partially intermingled phases through a common orifice, or a plurality thereof, where they are joined together in eccentric or side-by-side relation, into a setting medium, which may be either liquid or gaseous, and may function either by a coagulating, cooling, or evaporative effect to form unitary fibers in each of which the different thermoplastic materials form separate portions of the fiber body, as disclosed in prior application Serial No. 486,774, now Patent No. 2,386,173, by Kulp, Morehead, Sisson and Webb.

Any combination of thermoplastic fiber-forming substances or substances which may be rendered thermoplastic, and which have different properties, may be rendered potentially self-crimpable, and crimped, in accordance with this invention. The fiber-forming substances may be combinations of cellulose derivatives, such as cellulose esters of the type of cellulose acetates, cellulose propionates, cellulose butyrates; mixed cellulose esters of the type of cellulose aceto-propionates, aceto-butyrates, or the like; organic solvent-soluble cellulose ethers, such as methyl, ethyl, benzyl cellulose, etc., mixed cellulose ethers; mixed cellulose ester-ethers such as methyl cellulose acetate, ethyl cellulose proprionate, etc. The esters or their solutions may differ as to viscosity, cellulose content, as to degree of polymerization, or as to type and degree of substitution of the ester chain therein.

The fibers may also be formed from at least two different thermplastic resins, or thermosetting resins in thermoplastic condition, such as vinyl resins, which term includes the acrylate and alkacrylate resins, polymers of vinyl esters, such as vinyl acetates; polymers of vinyl ethers, such as vinyl acetals; vinylidene halides; polyethylenes; nylons (any long-chain synthetic polymer amide which has recurring amide groups as an integral part of the main polymer chain and which is capable of being formed into a filament in which the structural elements are oriented in the direction of the axis); methacrylate polymers; copolymers of vinyl esters and vinyl halides, notably copolymers of vinyl acetate and vinyl chloride; copolymers of vinyl chloride and acrylonitrile; copolymers of vinylidene chloride and vinyl chloride such as "Saran," etc. The fiber-forming resin compositions may differ as to kind of resin, degree of polymerization of the resins, or the viscosity of their solutions.

The composite thermoplastic fibers may be rendered potentially self-crimpable by subjecting them to stretching stress while they are in at least partially plastic condition, the amount of stretch being such as to go beyond the elastic limit of the component having the lower extensibility, and thereafter removing the plasticizer while the fibers are maintained under stress in order to set the fibers in the stretched state. The fibers may be stretched either during their spinning or after their coagulation, whether they are manufactured by the extrusion or evaporative process, and if stretch is imparted thereto after coagulation, the fibers may be heated or treated with swelling agents or both to bring them into a partially plasticized condition in which they readily undergo elongation under the application of mechanical stress.

The fibers may be stretched to any appropriate extent depending upon the nature of the fibers and the extent of crimp which it is desired to develop therein upon activation to effect shrinkage of at least one component. Fibers which have been stretched to several hundred or thousand percent of their original length, as well as those which have been stretched to less than 100% may be set in the stretched condition and thereby rendered potentially self-crimpable in accordance with the invention. In any event, the percentage of stretching that can be imparted to the composite thermoplastic fibers depends upon the extensibility of the respective component portions thereof, the component having the lower extensibility controlling the limit of elongation before rupture.

After stretching the at least partially plasticized fibers to the desired extent, they are brought to the unplasticized state and set in stretched condition, which may be accomplished by cooling the fibers if they have been plasticized by heating, or by removing the swelling agent, if such is present, while the fibers are maintained under conditions of tension. By reason of the fact that the fundamental properties of the two components are different, and that, during the stretching procedure, the micelles or molecules of the several component materials making up the fiber are oriented to different degrees, the stretched unplasticized fibers are in an unbalanced condition in which the several components thereof are under different internal strains, which unbalance persists after the removal of the plasticizing agent and the stretching stress, so that in the presence of a shrinkage agent for at least one component, the internally strained condition of at least that component is partially relieved and the fiber takes on a distinct crimp. The shrinkage agent may effect differential shrinkage of all of the components of the fiber, that is, all of the components may shrink but to different extents.

The composite fibers formed from thermoplastic fiber-forming materials having different shrinkage capacities or different shrinkage characteristics at any given temperature, may be activated to effect differential shrinkage of the several components, or shrinkage of at least one component, for example, by subjecting them to the given temperature, preferably in an inert medium. Differential shrinkage may also be effected by treating the fibers with air heated to the appropriate temperature, by treating them with steam or with air containing water vapor, or by treating them with swelling agents which may be liquid or solid chemical compounds, for instance, alcohol, acetone, ethyl acetate, diethylene glycol dipropionate, dibutyl phthalate, triphenylphosphate, or p-dimethylamine benzaldehyde, phenol, and o-hydroxy diphenyl. Such swelling agents may be applied as vapors or in the form of concentrated solutions, or in the form of aqueous emulsions or dispersions, and the fibers heated in the baths for a certain time but at lower temperatures than would be required if swelling agents were not present. In some cases the intrinsic difference in elasticity or shrinkage of the two components at room temperature may be sufficient to cause crimp upon relaxing after stretching, without further activation.

The crimp taken on by the composite thermoplastic fibers as a result of the activation of at least one component thereof is generally such that the fibers take the form of a regular or irregular helical coil which may reverse itself in direction at more or less frequent intervals of regular or irregular occurrence. Thus, a three-dimensional crimp with the crimps out of phase is present in the final composite fibers. The thermoplastic component which shrinks and crimps itself, or which undergoes the greatest shrinkage and self-crimping, during the activating treatment generally forms the inner portions of the fiber at the bends of the crimps.

The extent to which the several components of the potentially self-crimpable composite thermoplastic fibers crimp themselves upon activation, that is, the number of crimps per inch and the amplitude of the individual crimps will vary, depending upon the fiber size, the relative amounts and difference in shrinking ability of the components of the fiber, and upon the amount of stretch given to the fibers, as well as upon whether or not the internal stresses set up in the fibers by the stretching procedure are entirely released or, by controlling the activating conditions, only partially released during the activating treatment.

After activation of the fibers, the crimp developed therein during the activating step may be rendered permanent by cooling the fibers under conditions of relaxation, if the fibers have been activated by heat. In the case of swelling agents, the fibers may be deactivated and the crimp set therein by removing the swelling agent while the fibers are in relaxed condition, which will release the contracting forces and set the fibers in crimped condition.

This invention is of special advantage when it it desired to produce thermoplastic fibers which retain their crimp, or are crimpable, permanently. It is immaterial if the crimp is temporarily lost by stretching or as a result of drying under tension, after plasticizing, since the crimp may be regained and enhanced if the fibers are allowed to relax under the influence of heat. A wide latitude in the choice of the thermoplastic fiber-forming materials which may be used to produce the composite fibers is possible, and thermoplastic materials of widely varying shrinkage temperatures may be used.

In the drawing, reference character 2 indicates a filament generally and reference characters 3 and 4 indicate the two component portions of the filament which are constituted of different thermoplastic materials A and B extending side by side the length of the filament. Reference character 5 indicates one bend of the crimp. The component 4 of the filament is made of the material having the lesser tendency to shrink or the less recovery and component 3 is made of the material having the greater shrinkage tendency or greater elastic recovery. Since the component 4 is shrunk less than component 3, the component 4 is of greater length and forms the outside of the bends of the crimp and component 3 forms the inside of the bends of the crimp. It is to be understood that the crimp is actually of a three-dimensional character, and that the drawing shows the filament in a single plane. Furthermore, the drawing represents a highly idealized filament in which component 3 is represented as being of rough character, whereas component 4 is represented as being of extremely smooth character. It is obvious that both components may be smooth or both may have rough surface characteristics.

The unitary composite fibers may comprise two eccentrically arranged components one formed from a vinyl chloride-vinyl acetate copolymer having a shrinkage temperature of, say, 65° C., and the other formed from a vinyl chloride-acrylonitrile copolymer having a shrinkage temperature of, say, 115° C.; two eccentrically arranged components one formed from cellulose acetate having a shrinkage temperature of, say, 230° C., and the other formed from a vinyl chloride-acrylonitrile copolymer having a shrinkage temperature of, say, 115° C.; two eccentrically arranged components formed from nylons of the polyamide type having shrinkage temperatures of, say, 150 and 200° C., respectively, or two eccentrically arranged components, one formed from cellulose acetate having a shrinkage temperature of, say, 230° C., and the other formed from cellulose butyrate having a shrinkage of, say, 120° C. When the composite fiber is heated to a temperature in the range between the shrinkage temperatures of the respective components of the fibers, that component having the lower shrinkage temperature will immediately shrink and crimp itself, thus crimping the fiber as a whole whether the activation is a step in the initial manufacture of the fibers, or after temporary loss of the original crimpiness. The fibers, therefore, are permanently self-crimpable.

The composite thermoplastic fibers of the invention, in the form of continuous filaments or staple fibers, may be formed into yarns, either alone or in admixture with other fibers, and fabricated, as by knitting, weaving, felting, etc. The fibers may be activated to the crimped condition and cut to staple, or cut to staple and thereafter activated, the staple being processed in the crimped condition to facilitate carding, etc., and to give a more lofty yarn by reason of the crimped condition of the activated fibers. Since a certain amount of crimp is always lost during the processing of staple into yarn, the present invention is of special advantage in that the crimp may be restored at any step in the processing, either after the yarn is spun, after fabrication of the yarn into a fabric, or at both stages in the manufacture.

Fabrication of yarn comprising either the continuous filaments or staple fibers while the composite fibers of the invention are in potentially self-crimpable condition, i. e., substantially straight and smooth, will facilitate and simplify the fabricating procedure by reason of the easy passage of the yarns through the textile working machines. After fabrication, the structure may be treated to activate at least one component of the composite fibers to effect shrinkage and crimping thereof, with consequent crimping of the fiber as a whole. Upon deactivation, at least some of the fibers in the structure will be permanently crimped or permanently self-crimpable in situ therein and the structure will exhibit extremely valuable and unique properties. For example, fabricated structures comprising the composite thermoplastic fibers of this invention, may be pressed or ironed at a temperature above the shrinkage temperature of at least one component of the fibers and, due to the differentially internally strained condition of the fibers, the crimp will be retained or even enhanced during the ironing or pressing operation. Further, in the case of fabricated structures comprising the crimped composite fibers of the invention, if the crimp is lost as a result of exposure of the structure to conditions tending to plasticize the fibers and subsequently unplasticize them while under tension, the loss of crimp will be temporary only, and the crimp may be immediately restored upon heating, ironing, or pressing the structure at a temperature above the shrinkage temperature of at least one component of the fibers.

This retention or recovery of crimp upon ironing or pressing of the structure in the case of the composite thermoplastic fibers of the invention is of primary importance in the manufacture of fabricated structures having a lasting crimped effect. The same effects cannot be obtained with fabrics comprising the mechanically pre-crimped fibers available heretofore because when such fabrics are ironed or pressed, such crimped fibers flatten out and the crimp is lost and cannot be restored.

An outstanding feature of the invention is the fact that it will permit controlled shrinkage and crimping of the composite fibers either before processing or fabrication or in situ in a fabricated structure. The fabricated structures thus will retain or resume their original shape and dimensions during pressing or ironing, without distortion due to uncontrolled shrinkage and crimping of the fibers. This control results from the composite character of the fibers and their unbalanced condition in which the eccentrically arranged components are differentially internally strained, the tendency of one of the components to shrink freely and crimp itself at the given temperature being opposed or resisted by the reluctance of the remaining component or components to shrink, thereby controlling shrinkage of the fiber as a whole. This result cannot be attained by after-shrinking and crimping single component fibers either per se or in fabricated form.

Various modifications and changes may be made in practicing the invention, without departing from the spirit and scope thereof as defined by the appended claims.

I claim:
1. In the method of manufacturing composite artificial fibers, the steps comprising joining two thermoplastic materials having different shrinkage temperatures side-by-side to form a unitary fiber so that each thermoplastic component thereof has a portion of its peripheral surface disposed outside the periphery of each other component throughout the length of the fiber, rendering the fiber potentially self-crimpable by stretching it, while in at least partially plastic condition, beyond the elastic limit of at least one of the components and below the ultimate elongation of all of the components, thereafter bringing at least one of the components into the unplasticized condition while maintaining the fiber under tension, and subsequently crimping the fiber by heating it to a temperature within the range between the shrinkage temperatures of the components.

2. In the manufacture of composite fibers, the steps comprising joining two thermoplastic materials having different shrinkage temperatures side-by-side to form a unitary fiber so that each thermoplastic component thereof has a portion of its peripheral surface disposed outside the periphery of each other component throughout the length of the fiber, rendering the fiber potentially self-crimpable by stretching it, while in at least partially plastic condition, beyond the elastic limit of at least one of the components and below the ultimate elongation of all of the components, bringing the fiber into the unplasticized condition while maintaining it under tension, and subsequently crimping the fiber by heating it to a temperature within the range between the shrinkage temperatures of the components.

3. In the manufacture of composite fibers, the steps comprising joining two thermoplastic vinyl copolymers having different shrinkage temperatures side-by-side to form a unitary fiber so that each thermoplastic component thereof has a portion of its peripheral surface disposed outside the periphery of each other component throughout the length of the fiber, rendering the fiber potentially self-crimpable by stretching it, while in at least partially plastic condition, beyond the elastic limit of at least one of the components and below the ultimate elongation of all of the components, bringing the fiber into the unplasticized condition while maintaining it under tension, and subsequently crimping the fiber by heating it to a temperature within the range between the shrinkage temperatures of the components.

4. In the manufacture of composite artificial fibers, the steps comprising joining two thermoplastic cellulose derivatives having different shrinkage temperatures side-by-side to form a unitary fiber so that each thermoplastic component thereof has a portion of its peripheral surface disposed outside the periphery of each other component throughout the length of the fiber, rendering the fiber potentially self-crimpable by stretching it, while in at least partially plastic condition, beyond the elastic limit of at least one of the components, and below the ultimate elongation of all of the components, bringing it into the unplasticized condition while maintaining it under tension, and subsequently crimping the fiber by heating it to a temperature within the range between the shrinkage temperatures of the components.

5. In the manufacture of composite artificial fibers, the steps comprising joining two thermoplastic nylons having different shrinkage temperatures side-by-side to form a unitary fiber so that each thermoplastic component thereof has a portion of its peripheral surface disposed outside the periphery of each other component throughout the length of the fiber, rendering the fiber potentially self-crimpable by stretching it, while in at least partially plastic condition, beyond the elastic limit of at least one of the components, and below the ultimate elongation of all of the components, bringing it into the unplasticized condition while maintaining it under tension, and subsequently crimping the fiber by heating it to a temperature within the range between the shrinkage temperatures of the components.

6. Artificial composite fibers which are unitary in cross-section but which comprise at least two eccentrically arranged thermoplastic components extending side-by-side the entire length of the fiber with each component having a portion of its peripheral surface outside the periphery of each other component, joined by intermingled portions of the materials making up the components, and having different temperature-responsive characteristics, the fibers being in a stretched condition in which the components are differentially strained internally sufficiently to render them reversibly convertible between a crimped condition and a potentially crimpable substantially straight condition under the influence of changes in temperature and extension, the fibers in the straight condition being crimpable in response to shrinkage of at least one of the components upon heating the fiber to a temperature above the shrinkage temperature of at least one of the components.

7. Artificial composite fibers which are unitary in cross-section but which comprise at least two eccentrically arranged thermoplastic components extending side-by-side the entire length of the fiber with each component having a portion of its peripheral surface outside the periphery of each other component, joined by intermingled portions of the materials making up the components, and having different characteristics, the fiber being in a stretched condition in which the components are differentially strained internally sufficiently to render them reversibly convertible between a crimped condition and a potentially crimpable substantially straight condition under the influence of changes in temperature and extension, the fibers in the straight condition being crimpable in response to differential shrinkage of the several components upon heating of the fiber to a temperature above the shrinkage temperatures of at least two of the components.

8. Artificial composite fibers which are unitary in cross-section but which comprise two eccentrically arranged components extending side-by-side the entire length of the fiber with each component having a portion of its peripheral surface outside the periphery of each other component and joined by intermingled portions of the materials making up the components, said components being formed from vinyl copolymers having different characteristics, the fiber being in a stretched condition in which the components are differentially strained internally sufficiently to render them reversibly convertible between a crimped condition and a potentially crimpable substantially straight condition under the influence of changes in temperature and extension, the fibers in the straight condition being crimpable in response to shrinkage of the copolymeric component having the lower shrinkage temperature upon heating of the fiber to a temperature within the range between the shrinkage temperatures of the components.

9. Artificial composite fibers which are unitary in cross-section but which comprise two eccentrically arranged components formed from thermoplastic cellulose derivatives having different shrinkage temperatures extending side-by-side the entire length of the fiber with each component having a portion of its peripheral surface outside the periphery of each other component and joined by intermingled portions of the materials making up the components, the fiber being in a stretched condition in which the components are differentially strained internally sufficiently to render them reversibly convertible between a crimped condition and a potentially crimpable substantially straight condition under the influence of changes in temperature and extension, the fibers in the straight condition being crimpable in response to shrinkage of the component having the lower shrinkage temperature upon heating of the fiber to a temperature within the range between the shrinkage temperatures of the components.

10. Artificial composite fibers which are unitary in cross-section but which comprise two eccentrically arranged components formed from cellulose derivatives having different shrinkage temperatures comprising cellulose acetate and cellulose butyrate respectively, extending side-by-side the entire length of the fiber with each component having a portion of its peripheral surface outside the periphery of each other component and joined by intermingled portions of the materials making up the components, the fiber being in a stretched condition in which the components are differentially strained internally sufficiently to render them reversibly convertible between a crimped condition and a potentially crimpable substantially straight condition under the influence of changes in temperature and extension, the fibers in the straight condition being crimpable in response to shrinkage of the component having the lower shrinkage temperature upon heating of the fiber to a temperature within the range between the shrinkage temperatures of the components.

11. Potentially self-crimpable artificial composite fibers which are unitary in cross-section but which comprise two eccentrically arranged components formed from nylons having different shrinkage temperatures extending side-by-side the entire length of the fiber with each component having a portion of its peripheral surface outside the periphery of each other component and joined by intermingled portions of the materials making up the components, the fiber being in a stretched condition in which the components are differentially strained internally sufficiently to render them reversibly convertible between a crimped condition and a potentially crimpable substantially straight condition under the influence of changes in temperature and extension, the fibers in the straight condition being crimpable in response to shrinkage of the component having the lower shrinkage temperature upon heating of the fiber to a temperature within the range between the shrinkage temperatures of the components.

WAYNE A. SISSON.

REFERENCES CITED

The following references are of record in the file of this patent:

UNITED STATES PATENTS

| Number | Name | Date |
| --- | --- | --- |
| 1,976,201 | Taylor | Oct. 9, 1934 |
| 2,238,694 | Graves | Apr. 15, 1941 |
| 2,249,745 | Charch | July 22, 1941 |
| 2,310,785 | Herrmann | Feb. 9, 1943 |
| 2,328,074 | Hunter | Aug. 31, 1943 |

FOREIGN PATENTS

| Number | Country | Date |
| --- | --- | --- |
| 51,307 | Netherlands | Oct. 15, 1941 |
| 837,555 | France | Feb. 14, 1939 |